Figure 1:
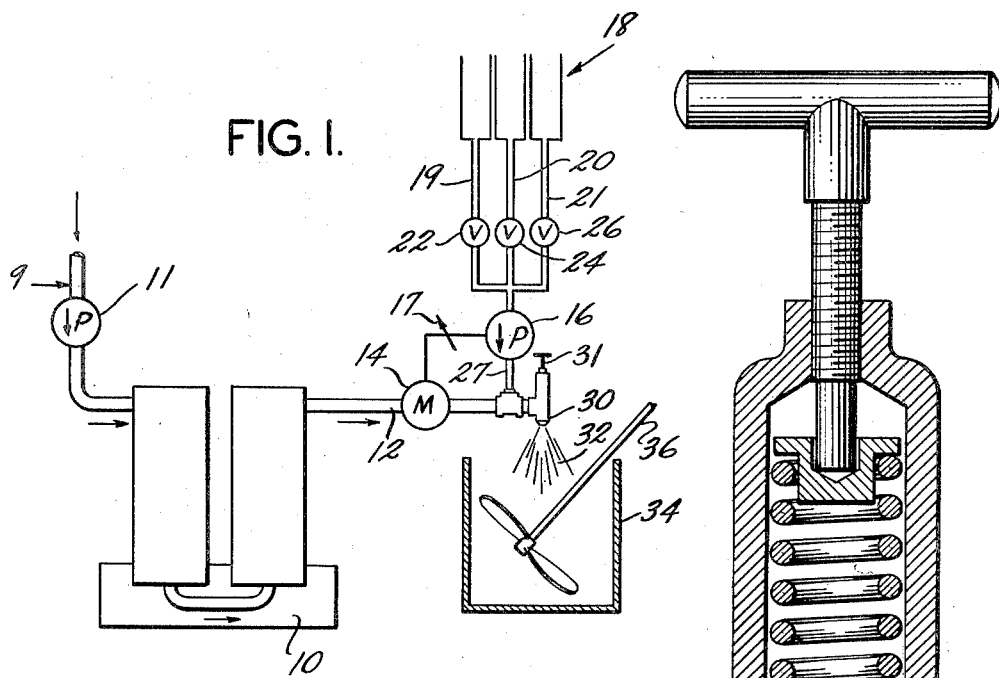

Nov. 13, 1956  O. JOHNSON  2,770,544
CONTINUOUS METHOD OF MIXING
Filed Jan. 11, 1952

INVENTOR
OGDEN JOHNSON
BY
ATTORNEYS.

United States Patent Office 2,770,544
Patented Nov. 13, 1956

2,770,544
CONTINUOUS METHOD OF MIXING

Ogden Johnson, Bronxville, N. Y., assignor to Ford, Bacon & Davis, Inc., New York, N. Y., a corporation of New Jersey Application January 11, 1952, Serial No. 265,959

8 Claims. (Cl. 99—123)

This invention relates to a method and apparatus for mixing plastic or liquid components, and particularly for intimately admixing with a base material, such as shortening, one or more additives such as emulsifiers, antioxidants and the like.

In the preparation of culinary mixes, for example, various types of shortening are used. These are usually plastic, such as hydrogenated vegetable oils or mixtures of normally liquid and solid fats. The plastic shortenings are generally modified by the manufacturers to suit the requirements of the user. Such modifications may be the addition of higher melting point fat components to adjust the shortening to climatic conditions, also the addition of antioxidants to improve keeping qualities, and also the addition of emulsifying agents to increase the capacity to absorb water when the shortening is mixed with other ingredients to produce culinary mixes. One or more of such additives are customarily mixed in with the shortening base while the latter is in a liquid form before chilling the mixture to its plastic state.

It is well known that the shortening requirements differ considerably for various types of baked goods. Thus, for example, the shortening requirements for pie crusts and various types of cake mixes each require, for optimum results, shortenings containing different additives in varying amounts. As a result, it is necessary for manufacturers of industrial shortenings to make and sell, and for members of the baking industry to buy and maintain inventories of a considerable number of types of shortening, each type having limited use.

In my prior Patent No. 2,499,586, I have described a method in which super-cooled shortening is used as an ingredient of a culinary mix. In such a method, if shortening with different components is required, it is necessary to have different stocks with different components available for super-cooling.

The use of shortening either in the normal state or in the super-cooled state requires large inventories and attendant difficulties in shifting from one shortening to another.

The present invention is designed to overcome this difficulty by making it possible for a baker or a manufacturer of culinary mixes to utilize a standard shortening base for all types of baked goods and to modify the standard shortening base at will to suit the particular requirements of any given type of culinary mix or baked goods.

In its broader aspects, the invention provides a method and apparatus for intimately and continuously admixing a base material with one or more additives, in any desired preselected proportion, and in any desired total quantity.

The method of this invention involves essentially a continuous injection of a stream of preselected quantity of one or more materials into a continuous stream of liquid or plastic base material maintained at superatmospheric pressure of at least 300 p. s. i., and then suddenly releasing the pressure on the combined streams to accelerate their rate of flow and produce an extreme turbulence and mixing. The flow may be started and stopped to produce any desired quantities of the mixed product, but during the mixing period the flow of materials is continuous. The mixture may be directed into a receiving vessel for storage or shipment, or into a vessel which contains or to which is added ingredients of a dough, batter or culinary mix.

The apparatus of this invention in essence comprises pump means for advancing, at a superatmospheric pressure of at least 300 p. s. i., the liquid or plastic base material along a first confined path; one or more additional pumps for advancing, at a pressure at least equal to said superatmospheric pressure, one or more additives along one or more confined paths terminating within the first path; metering means in the first path between the first pump means and the terminus of the additional path or paths to sense the volumetric rate of flow of the base material; adjustable control means actuated by the metering means for controlling the additional pump or pumps and maintaining a preselected ratio of advancement of the base material and the additive or additives; and a discharge at the end of the first confined path immediately after it passes beyond the terminus of the additional confined path or paths for suddenly reducing the atmospheric pressure on the materials, accelerating their rate of flow and inducing an extremely turbulent mixing of the combined materials.

When it is desired to apply the invention to the intimate and continuous admixture of additives such as described above with shortening, it is the preferred procedure to chill the shortening in a "Votator" or similar apparatus with or without the entrapment of air or other gas in the shortening and to advance the shortening toward a discharge or extrusion nozzle at pressures of at least about 300 p. s. i., preferably at pressures ranging between about 300 and about 400 p. s. i. One or more additives, depending upon the particular shortening requirements, is separately injected simultaneously into the advancing stream of shortening at a point immediately in advance of the discharge. Control means operatively connecting a pump or pumps for advancing the additive in the path of the shortening is utilized to inject preselected amounts of the additive or additives into a stream of shortening. Upon extrusion or discharge from the nozzle, the admixed ingredients are accelerated to a high degree of turbulence, whereupon the ingredients become thoroughly and uniformly admixed. In this form they may be released into the receiver into which they are to be used.

One of the primary advantages of the method and apparatus of this invention is that it enables a baker or culinary mix manufacturer to utilize a single stock of shortening in the production of a large variety of baked goods or culinary mixes and to adjust the nature and proportion of antioxidant, emulsifier, or the like to suit the special requirements of any particular product.

Another advantage of the invention is that it is not necessary to purchase a large variety of various specialty grades of shortening, thus making possible considerable savings in inventary and reducing the number of processing units to a single installation.

Still another advantage of the invention is that there is relatively little "hold-up" of the mixed shortening and emulsifier, and when changing from one mixture to another it is not necessary to clean out long lines.

Another advantage of the invention is that it eliminates special blending operations.

It is preferred in the method of this invention that from about 5 to 20% of air or other gas, by volume at atmospheric pressure, be intimately admixed with and entrapped in the base material, prior to extrusion. The reason for this preference is that the expansion in volume of the entrapped air or gas upon release of the blended ingredients from pressures of 300 p. s. i., or higher, enhances the intimacy and uniformity of mixing of the materials.

Figure 2:
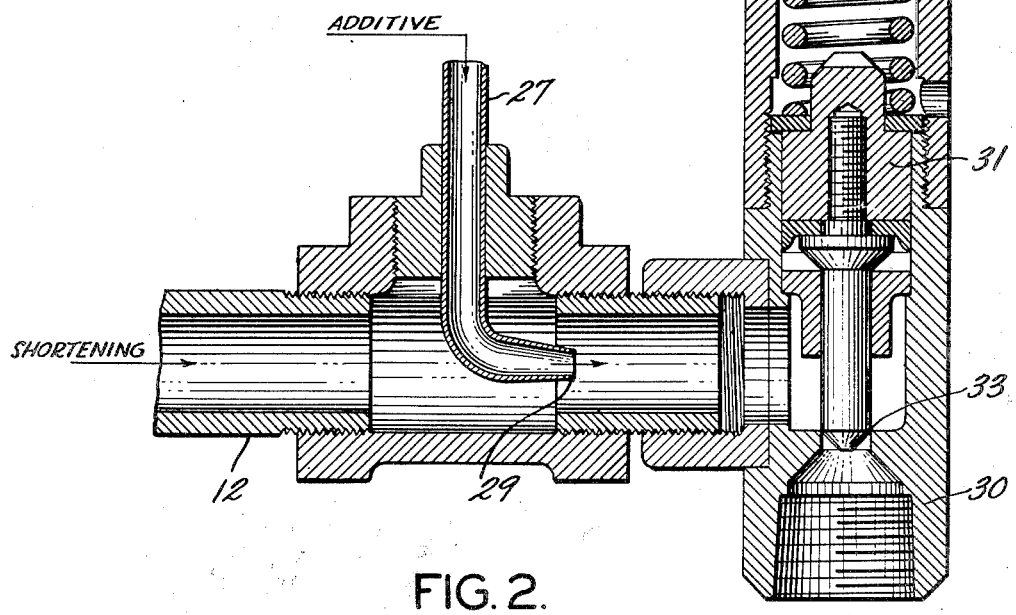

These and other advantages, as well as the utility of the invention, will become more apparent from the following detailed description made with reference to the accompanying drawing, wherein:

Figure 1 illustrates a typical installation designed in accordance with the present invention for the blending of a shortening base with one or more additives; and Figure 2 is a detailed cross-sectional view illustrating one preferred structure found particularly suitable for injecting one or more additives into an advancing stream of shortening.

Referring now to Figure 1, the shortening base stock is advanced through a "Votator" 10, wherein it is supercooled and agitated at a pressure of at least 300 p. s. i., by means of a pump 11. The super-cooled shortening in a viscous liquid condition, preferably with air or other gas incorporated therein through the inlet 9, is discharged from the votator 10 into a pipe 12 provided with a metering device 14 that is operatively connected to a second pump 16 through the medium of a control device indicated at 17. The control device 17 is adjustable and controls the output of the pump 16 in desired percentage of the volume of the shortening stock being measured by meter 14. One or more additives enter the system from one of say three tanks generally indicated at 18 by way of lines 19, 20 and 21, the type of additive relative to one another being subject to control by means of valves 22, 24 and 26. In many forms of the invention one tank will be sufficient. The selected additive is then injected into the stream of shortening by means of pump 16 through line 27. The additive is introduced through one or more nozzles 29, illustrated more particularly in Figure 2. The nozzle 29 is preferably in the center of the flowing stream of shortening so that the additive is surrounded by the shortening. If desired, a pump P may be in each of the lines 19, 20 and 21 and may be controlled by one or more controls 17.

The combined stream of shortening and additive then proceeds to an extrusion nozzle 30, the opening and closing of which is controlled by a pressure biased or relief valve indicated generally at 31. The materials, leaving the extrusion nozzle through the small space 33 and being suddenly relieved of the superatmospheric pressure to which they are subjected in the lines 12 and 27, become accelerated and form a highly turbulent flow which thoroughly mixes the additive with the shortening base. When air or an inert gas is intimately admixed with and entrapped in the base shortening stock while under pressure, the expansion of the air or gas due to the release of pressure adds to the turbulence and improves the mixing effect. Notwithstanding the fact that the shortening base has already been chilled to its viscous liquid state, the high degree of agitation provided by the high pressure nozzle is sufficient to assure thorough admixture. The mixture 32 is directed into a receiving vessel such as shown at 34. Materials such as flour, sugar, eggs, flavoring, milk and water may be added before, simultaneously with, or after the required amount of modified shortening is placed into the vessel 34 and be thoroughly admixed therewith by any suitable means such as an agitator 36.

After a desired given total quantity of the mixed product is prepared the stock from the votator may be recirculated in order to avoid closing down the votator.

As an example of the invention, a partially hydrogenated base of a mixture of cottonseed and soybean oil is super-cooled in the votator in accordance with conventional practice and passed through line 12. An emulsifier comprising a mixture of mono-and diglycerides of stearic acid molten form is maintained in a tank 18 and withdrawn through the pipe 19. The valve 22 is open and the valves 24 and 26 are closed. The means 17 is adjusted so that the pump 16 adds 5% of the diglycerides through the nozzle 29. The diglycerides, being in liquid form, are cooled by the shortening base as the mixture passes through the high pressure nozzle. The mixture is added to ingredients forming a white cake mix.

The additive may have the same as or different consistency than the base and may have the same or a different temperature. Differences can be utilized because of the effective mixing obtained by the high pressure nozzle. The temperatures should be such, considering the proportions, that the final product 32 has the desired temperature. Many emulsifiers have a melting point higher than the base stock. It is possible, in accordance with my invention, to add the emulsifier in molten form to the chilled shortening due to the effective mixing, without detracting from the plastic properties of the product. In such a case, of course, the base stock must be chilled to a slightly lower temperature in order that the mixed product may have the final wanted temperature.

In another example of my invention, the valves 22 and 26 are closed and the valve 24 is open. About 6% of high melting point hydrogenated cottonseed oil is added to the same shortening base and the mixture is added to ingredients forming a gingerbread mix, which is to be distributed in the South during warm weather.

In another example of my invention a shortening is composed of about 80% unhydrogenated or partially hydrogenated vegetable oils (liquid) at room temperature and about 20% stearin. The mixture of the normally liquid oil and the normally solid stearin gives a product having the desired consistency at room temperature. In this embodiment of my invention, the base oil by-passes the votator and is fed into line 12 directly ahead of the meter 14 by an appropriate high pressure pump, which may also admix air or an inert gas with the oil. The valves 22 and 24 are closed and valve 26 is open. The pump 16 is adjusted by 17 to pump 20% of stearin which is heated above its melting point. The oil may be chilled slightly if desired so that the mixture has the final desired temperature. The two ingredients are so well mixed in the high pressure nozzle that the mixture exits from the nozzle similar to that of shortenings of the "compound" type. The shortening is added to ingredients of a doughnut mix or other type that does not require shortening to be added in a plastic state.

As still another example of my invention, lard is chilled in the votator and about 8% of hydrogenated lard stearin having a titer of between 55 and 60° C. is added through the line 21 in the manner described previously, to provide a lard having a somewhat stiffer consistency. As a further example of my invention, lard is chilled and 0.05% of gum guaiac is similarly added through the line 21 and admixed with the lard to stabilize it. If desired, and this may be the preferable procedure in view of the small amount of the stabilizer employed, the gum guaiac may be mixed in the melted lard stearin and the mixture of gum guaiac and lard stearin added through line 21.

While the detailed description of the invention has been confined herein to the admixture of one or more modifying agents with a shortening base, it is to be understood that the invention is readily applicable to the intimate and uniform admixture of other materials. These and other applications and modifications will become apparent readily to those skilled in the art upon reading this description. All such applications and modifications are intended to be included within the scope of the invention as defined in the following claims.

I claim:

1. A method of intimately and continuously admixing an additive with a stream of base material which comprises continuously advancing the stream of base material under a superatmospheric pressure of at least 300 p. s. i., continuously injecting, at a pressure at least equal to the pressure of the stream of base material, a stream of said additive into the stream of base material, and immediately thereafter releasing the combined streams of base material and additive from said superatmospheric pressure to accelerate the rate of flow of the combined streams and provide a high degree of turbulence to intimately mix the materials.

2. A method of intimately and continuously admixing an additive with a stream of a shortening stock which comprises continuously advancing the stream of the shortening stock under a superatmospheric pressure of at least 300 p. s. i., continuously injecting, at a pressure at least equal to the pressure of the stream of shortening stock, a stream of said additive into the stream of shortening stock, and immediately thereafter releasing the combined streams of shortening stock and additive from said superatmospheric pressure to accelerate the rate of flow of the combined streams and provide a high degree of turbulence and intimate admixture.

3. A method of intimately and continuously admixing an additive with a stream of a shortening stock which comprises continuously advancing the stream of shortening stock and admixing a gas therewith under a superatmospheric pressure of at least 300 p. s. i., continuously injecting, at a pressure at least equal to the pressure of the stream of shortening stock, a stream of said additive into substantially the center of the stream of shortening stock, and immediately thereafter releasing the combined streams of shortening stock and additive from said superatmospheric pressure, whereby the accelerated rate of flow of the combined streams and the expansion of the gas in the stock provides a high degree of turbulence and intimate admixture.

4. A method of intimately and continuously admixing an emulsifier with a shortening stock which comprises continuously advancing the stream of shortening stock, admixing a gas therewith and super-cooling the shortening stock under a superatmospheric pressure of at least 300 p. s. i., continuously injecting, at a pressure at least equal to the pressure of the stream of shortening stock, a stream of an emulsifier into the stream of shortening stock, and immediately thereafter releasing the combined streams of shortening stock and emulsifier from said superatmospheric pressure, whereby the accelerated rate of flow of the combined streams and the expansion of the gas in the stock provides a high degree of turbulence and intimate admixture.

5. A method of intimately and continuously admixing a stearin with a shortening stock which comprises continuously advancing the stream of shortening stock under a superatmospheric pressure of at least 300 p. s. i., continuously injecting, at a pressure at least equal to the pressure of the stream of base material, a stream of stearin in molten form into the stream of shortening stock and immediately thereafter releasing the combined streams from said superatmospheric pressure to accelerate the rate of flow of the combined streams and provide a high degree of turbulence and intimate admixture.

6. A method of intimately and continuously admixing an antioxidant with a stream of shortening stock which comprises continuously advancing the stream of shortening stock under a superatmospheric pressure of at least 300 p. s. i., continuously injecting, at a pressure at least equal to the pressure of the stream of shortening stock, a stream of an antioxidant into the stream of shortening stock, and immediately thereafter releasing the combined streams from said superatmospheric pressure to accelerate the rate of flow of the combined streams and provide a high degree of turbulence and intimate admixture.

7. A method of intimately and continuously admixing an additive with a stream of a shortening stock which comprises continuously advancing the stream of shortening stock under a superatmospheric pressure of at least 300 p. s. i., continuously injecting, at a pressure at least equal to the pressure of the stream of shortening stock, a stream of said additive into the stream of shortening stock, immediately thereafter releasing the combined streams of shortening stock and additive from said superatmospheric pressure to accelerate the rate of flow of the combined streams and provide a high degree of turbulence, and mixing the shortening stock and additive with ingredients forming a culinary mixture.

8. A method of intimately and continuously admixing an additive with a stream of a shortening stock which comprises continuously supercooling and advancing the stream of shortening stock under a superatmospheric pressure of at least 300 p. s. i., continuously injecting, at a pressure at least equal to the pressure of the stream of shortening stock and at a temperature above the melting point of the additive, a stream of said additive into the stream of shortening stock, and immediately thereafter, before the additive has set, releasing the combined streams of shortening stock and additive from said superatmospheric pressure to accelerate the rate of flow of the combined streams and provide a high degree of turbulence.

References Cited in the file of this patent

UNITED STATES PATENTS

| | | |
|---|---|---|
| 2,088,591 | Ferkel | Aug. 3, 1937 |
| 2,203,980 | Burt | June 11, 1940 |
| 2,219,656 | Miller | Oct. 29, 1940 |
| 2,444,307 | Penn | June 29, 1948 |
| 2,592,224 | Wilson et al. | Apr. 8, 1952 |

FOREIGN PATENTS

| | | |
|---|---|---|
| 494,204 | Great Britain | Oct. 21, 1938 |
| 169,076 | Australia | Oct. 10, 1951 |